United States Patent [19]

Matsui

[11] Patent Number: 5,615,141
[45] Date of Patent: Mar. 25, 1997

[54] MULTIPLYING APPARATUS

[75] Inventor: Hideo Matsui, Itami, Japan

[73] Assignee: Mitsubishi Denki Kabushiki Kaisha, Tokyo, Japan

[21] Appl. No.: 452,618

[22] Filed: May 25, 1995

[30] Foreign Application Priority Data

Jun. 15, 1994 [JP] Japan .................................. 6-133342

[51] Int. Cl.⁶ .................................................. G06F 7/52
[52] U.S. Cl. ............................................ 364/757; 364/754
[58] Field of Search ..................................... 364/754, 755, 364/756, 757, 759, 760, 758, 736, 768, 784–788

[56] References Cited

U.S. PATENT DOCUMENTS

| | | | |
|---|---|---|---|
| 3,805,043 | 10/1972 | Clary | 364/758 |
| 5,262,975 | 11/1993 | Ohki | 364/757 |
| 5,325,321 | 6/1994 | Ishida | 364/760 |
| 5,337,268 | 8/1994 | Kojima | 364/760 |
| 5,457,646 | 10/1995 | Jang et al. | 364/757 |

FOREIGN PATENT DOCUMENTS

3540800A1  8/1987  Germany .
3901995C2  8/1989  Germany .

*Primary Examiner*—Paul P. Gordon
*Assistant Examiner*—Emmanuel L. Moise
*Attorney, Agent, or Firm*—Lowe, Price, LeBlanc & Becker

[57] ABSTRACT

A multiplying apparatus, capable of processing in relatively high speed with relatively small hardware quantity, in which the circuits for relative-digits are composed of adders $1a$, $1b$, $1c$, $1d$, first D-flip flops $3a$, $3b$, $3c$, $3d$ propagating the respective digits of a multiplier while latching them successively in synchronism with the clock CLK, second D-flip flops $2a$, $2b$, $2c$, $2d$ latching either the respective additional results of the adders of the digits of themselves or the respective additional results of the adders of the next digits according to respective values being latched by the first D-flip flops $3a$, $3b$, $3c$, $3d$ in synchronism with the clock CLK, and delay circuits $5a$, $5b$, $5c$ delaying the propagation of the clock CLK to the next digit until the adders $1a$, $1b$, $1c$, $1d$ for the respective digits output the respective carries, in other words, until the adders $1a$, $1b$, $1c$, $1d$ finish the respective additional operations.

3 Claims, 4 Drawing Sheets

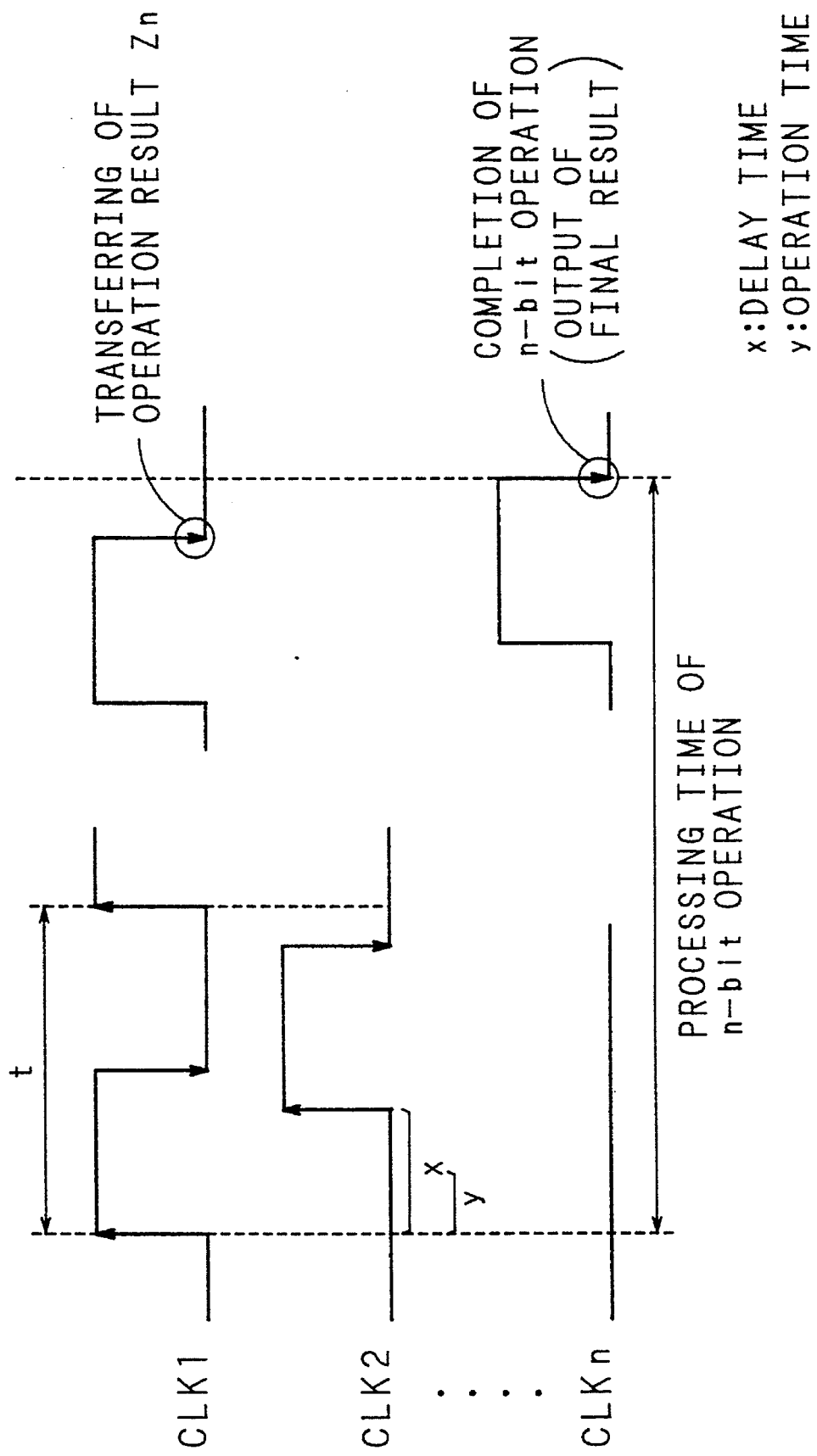

MULTIPLYING APPARATUS

BACKGROUND OF THE INVENTION

1. Field of the Invention

The present invention relates to a multiplying apparatus, more particularly to a multiplying apparatus suitable for being used when it is built in a computer system, specially in a microcomputer.

2. Description of Related Art

As a general conventional example of a multiplying apparatus built in a computer system, specially in a microcomputer, two methods are well known, that is, a parallel operation method in which adding circuits of plural stages are used, and a serial operation method in which addition is performed by adding circuit of one stage due to repetition based on a microprogram.

FIG. 1 is a schematic diagram showing a configuration example of a hardware for a conventional parallel operation method. In addition, it is assumed here that both a multiplicand and a multiplier are four bits.

In FIG. 1, reference characters 51a through 51f respectively show half adders (HA), and reference characters 52a through 52f respectively show full adders (FA). And characters X1 through X4 show respective digits of the multiplicand of four bits in binary number expression, characters Y1 through Y4 show respective digits of the multiplier of four bits in binary number expression, and characters Z1 through Z8 show respective digits of the multiplication result.

In the parallel operation method which is performed by such a hardware having the configuration shown in FIG. 1, when respective digits of the multiplicand and respective digits of the multiplier are given, addition is performed in adding circuits in respective stages successively in such a procedure that, after addition is performed in the adding circuit in each stage, the addition result and a carry are propagated to the adders in the next stage, and finally the respective digits Z1 through Z8 of the multiplication result are obtained.

In such a parallel operation method, when respective digits of the multiplicand and respective digits of the multiplier are given, since the multiplication result is outputted immediately although there is a little circuit delay in each adder, it is possible to process in relatively high speed. But, basically, the adding circuit in each stage requires adders equal to that of the digits of a multiplicand, and adding circuit must have the stages whose number is equal to that of the digits of a multiplier, the fact resulting in increasing in hardware quantity.

FIG. 2 is a schematic diagram showing a hardware configuration and procedure of a conventional serial operation method. Here, it is assumed that both a multiplicand and a multiplier are four bits.

In FIG. 2, reference numeral 61 designates a multiplicand register in which respective digits X1, X2, X3, X4 of a multiplicand are held, numeral 62 designates an adding circuit, and numeral 63 designates an addition result register respectively. In addition, in FIG. 2, vertical direction shows a lapse of time.

In such a method shown in FIG. 2, at first in a first cycle C1, the first digit Y1 of the multiplier is added to all of the digits of the multiplicand held in the multiplicand register 61 to obtain the first digit Z1 of the multiplication result. In the next second cycle C2, the second digit Y2 of the multiplier is added to all of the digits of the multiplicand to obtain the second digit Z2 of the multiplication result. In the following, according to the same procedure, addition is repeated until the fourth cycle C4, and the results are shifted one by one and held in the addition result register 63, thereby the multiplication result is obtained finally.

In such a serial operation method, the hardware quantity becomes relatively small because the adding circuits require only one stage of adders whose number is equal to that of the bits of the multiplicand, however, high speed processing can not be expected because the additional operation based on the microprogram must be repeated equal number of times to the number of the bits of the multiplier.

Conventionally, a general multiplying apparatus built in a microcomputer has problems that, in the parallel operation method, high speed processing is possible but the hardware quantity is increased, and in the serial operation method, the hardware quantity is small but high speed processing can not be expected.

SUMMARY OF THE INVENTION

The present invention has been devised in such circumstances, and the object thereof is to provide a multiplying apparatus capable of processing in relatively high speed with a relatively small hardware quantity.

The multiplying apparatus related to the invention is provided with, at the each digit circuit, an adder, a first D-flip flop propagating each digit of a multiplier to the next digit while it is latching each digit successively in synchronism with the clock, a second D-flip flop latching either the addition result of the adder for the digit of itself or the addition result of an adder for the next digit in synchronism with the clock, according to a value which the first D-flip flop latches, and a delay circuit delaying the clock propagation to the next digit until an adder for each digit outputs a carry, in other words, until additional operation is completed.

In the multiplying apparatus related to the invention, each adder operates continuously while it shifts one by one by a time necessary for each adder to perform addition, by the fact that the clock propagation to the next digit is delayed at least by a time necessary for the adder to perform addition.

The above and further objects and features of the invention will more fully be apparent from the following detailed description with accompanying drawings.

BRIEF DESCRIPTION OF THE DRAWINGS

FIG. 4 is a timing chart showing a relationship between cycle of a clock CLK generated by a control circuit, delay time due to each delay circuit and operation time due to each adder of the multiplying apparatus of the invention.

DESCRIPTION OF THE PREFERRED EMBODIMENTS

In the following, explanation on the invention will be made in detail referring to drawings showing the embodiments thereof.

Figure 1:
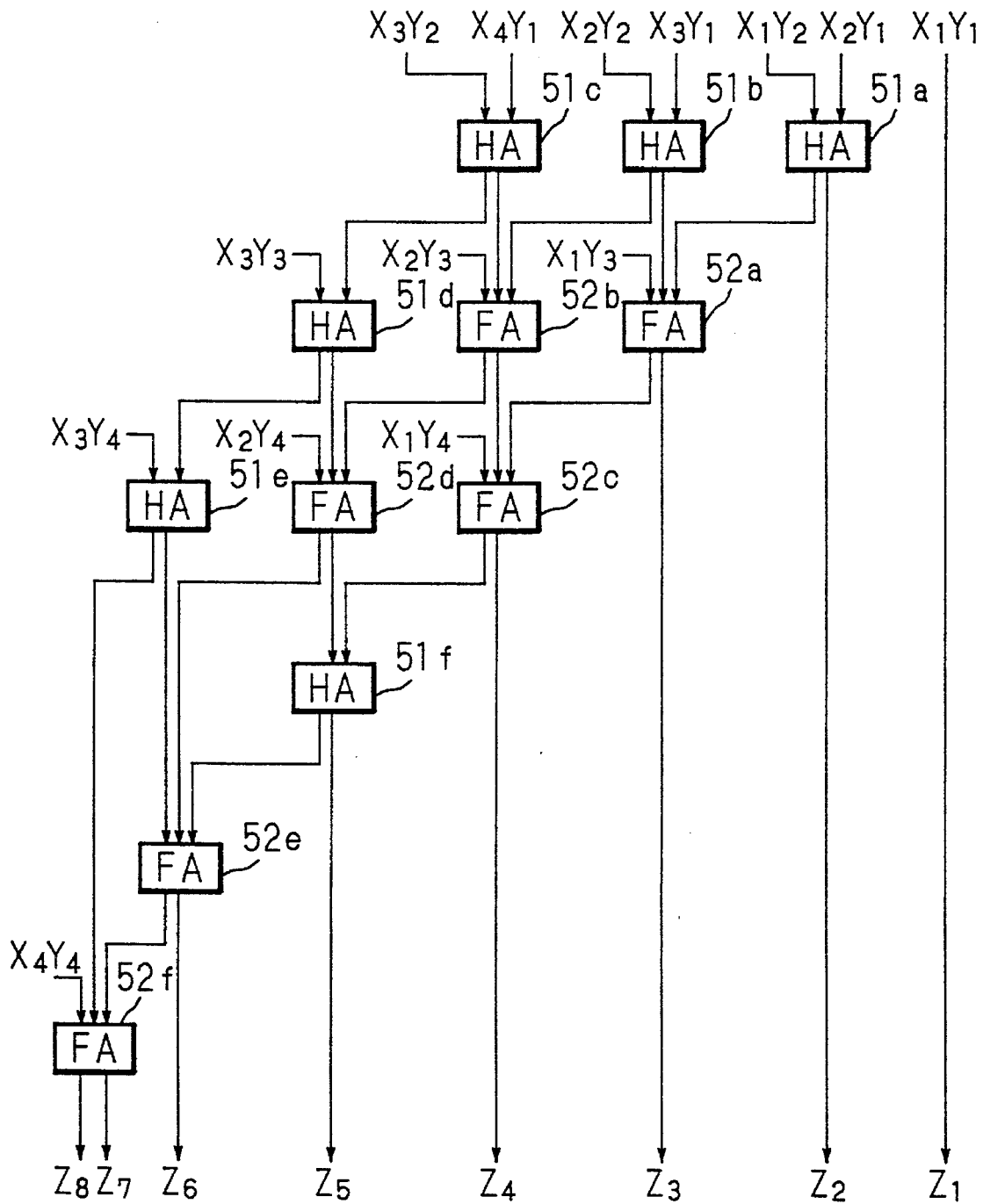
FIG. 1 is a schematic diagram showing a configuration example of a hardware for a conventional parallel operation method.
Figure 2:
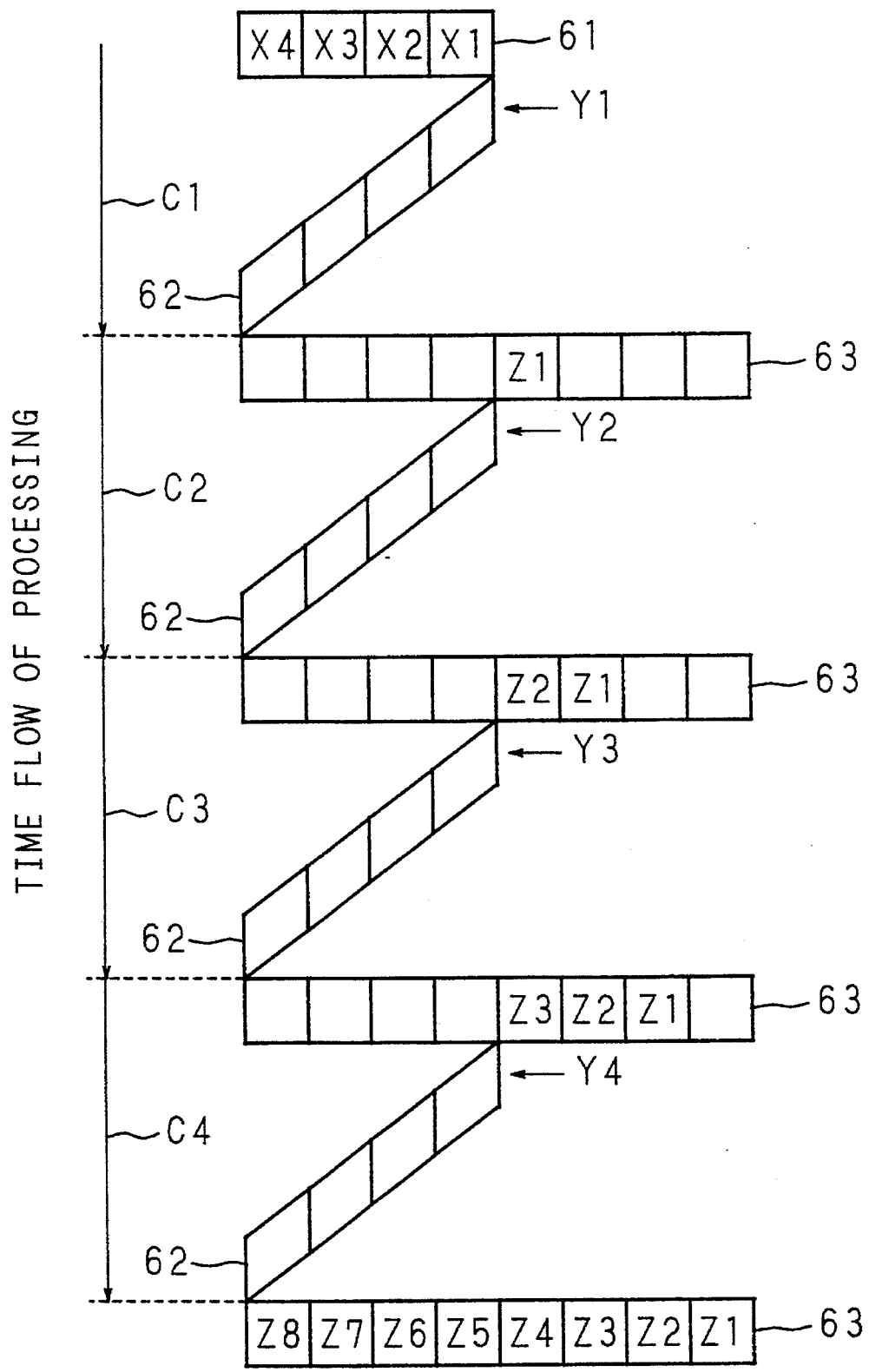
FIG. 2 is a schematic diagram showing a hardware configuration and procedure of a conventional serial operation method.
Figure 3:
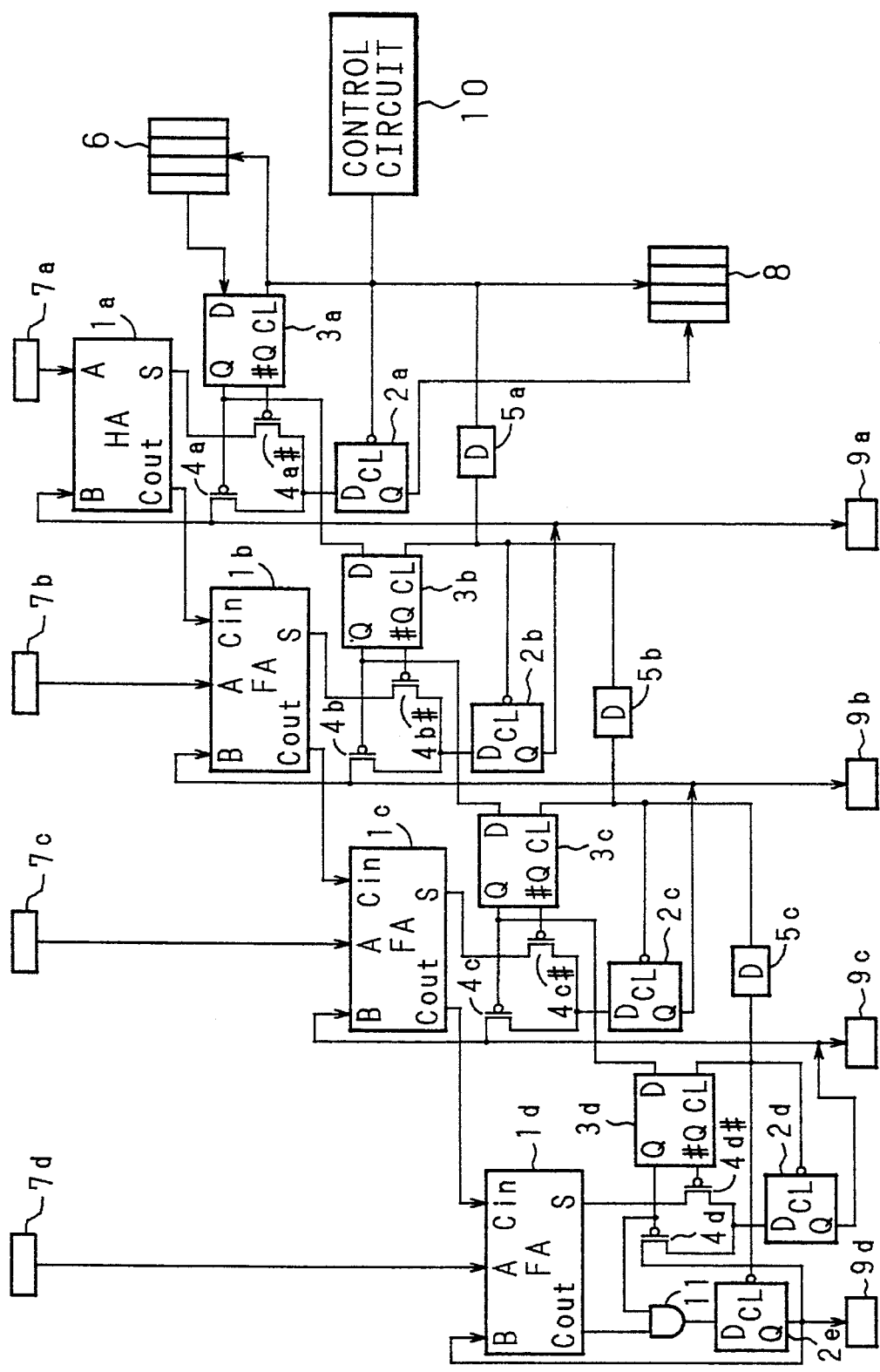
FIG. 3 is a circuit diagram showing a configuration example of a multiplying apparatus of the invention.

FIG. 3 is a circuit, diagram showing a configuration example of a multiplying apparatus of the invention. In addition, the circuit diagram shown in FIG. 3 is for a circuit which performs operation of four bits of both a multiplicand and a multiplier.

In FIG. 3, reference character 10 designates a control circuits which supplies clocks for controlling the respective D-flip flop and shift registers to be described later.

Reference character 1a through 1d designate adders respectively. Among them, the character 1a designates a half adder (HA) which has input terminals A, B and an output terminal S, and further a carry output terminal Cout.

Reference character 1b through 1d designate full adders (FA) respectively, each of the full adders having the input, terminals A, B, a carry input terminals Cin and output terminals S, and further carry output terminals Cout.

Refecence characters 2a through 2e designate D-flip flops respectively. Each of the D-flip flops is for latching the addition result, and having an input terminal D and an output terminal Q, and further an input terminal CL for the clock.

Reference characters 3a through 3d designate D-flip flops respectively. Each of the D-flip flops is for latching a multiplier, and having an input terminal D, an output terminal Q and an inverted output terminal #Q, and further an input terminal CL for the clock.

Reference character 4a through 4d, and 4a# through 4d# designate transistor gates respectively. Each of the transistor gates is for selecting data which each of the D-flip flops 2a through 2d is made latch.

Reference characters 5a through 5c designate delay circuits (D) respectively. The delay circuits output clock CLK generated by the control circuit 10 after delaying it in order to compensate the propagation delay of the carry generated in the respective adders 1a through 1c except the fourth digit circuit.

Reference numeral 6 designates a shift register (hereinafter to be called a multiplier register) for storing a multiplier. This multiplier register 6 is shift-controlled by the clock CLK generated by the control circuit 10.

Reference numeral (7a, 7b, 7c, 7d) designates a shift register (hereinafter to be called a multiplicand register) for storing a multiplicand.

Reference numeral 8 designates a shift register (hereinafter to be called a multiplication result lower register) for storing lower four digits of the multiplication result. The multiplication result lower-register 8 is shift-controlled by the clock CLK generated by the control circuit 10.

Reference numeral 9 (9a, 9b, 9c, 9d) designates a register (hereinafter to be called a multiplication result higher register) for storing the higher four digits of the multiplication result.

In addition, reference numeral 11 designates an AND gate.

The multiplying apparatus of the invention is mainly composed of the aforementioned components, and explanation will be made on their connections in the following. The respective digits of the multiplicand register 7 are 7a, 7b, 7c, 7d from the lowest digit side, and they are inputted to the input terminals A of the adders 1a, 1b, 1c, 1d respectively.

To the input terminal D of the D-flip flop 3a of the the first digit circuit, the output from the multiplier register 6 is inputted, and to the clock terminal CL of the same, the clock CLK outputted from the control circuit 10 is inputted, and the output signal from the output terminal Q of the same controls on/off of the transistor gate 4a and the output signal from the output terminal #Q of the same controls on/off of the transistor gate 4a#.

To the input terminal B of the adder 1a of the first digit circuit, the output terminal Q of the D-flip flop 2b of the second digit circuit is connected, the output terminals S of the same is connected to the input terminal D of the D-flip flop 2a through the transistor gate 4a#, and the carry output terminal Cout of the same is connected to the carry input terminal Cin of the second digit circuit.

The output terminal Q of the D-flip flop 2a of the first digit circuit is connected to the multiplication result lower register 8, and to the clock terminal CL of the same, the clock CLK is supplied from the control circuit 10.

In addition, to the delay circuit 5a of the first digit circuit, the clock CLK is supplied from the control circuit 10, and the output of the delay circuit 5a is connected to the clock terminal CL of the D-flip flop 3b, to the clock terminal CL of the D-flip flop 2b and to the delay circuit 5b of the second digit circuit, respectively.

To the input terminal D of the D-flip flop 3b of the second digit circuit, the output of the output terminal Q of the D-flip flop 3a of the first digit circuit is given, and to the clock terminal CL of the same, the output of the delay circuit 5a of the first digit circuit is given. The output signal from the output terminal Q of the D-flip flop 3b controls on/off of the transistor gate 4b and the output signal from the output terminal #Q of the same controls on/off of the transistor gate 4b#.

To the carry input terminal Cin of the adder 1b of the second digit circuit, the carry output terminal Cout of the adder 1a of the first digit circuit is connected, and to the input terminal B of the same to the output terminal Q of the D-flip flop 2c of the third digit circuit. The output terminal S of the same is connected to the input terminal D of the D-flip flop 2b through the transistor gate 4b# and the carry output terminal Cout of the same to the carry input terminal Cin of the adder 1c of the third digit circuit.

And the output terminal Q of the D-flip flop 2b of the second digit circuit is connected to the multiplication result higher register 9a, and to the clock terminal CL of the same, the output of the delay circuit 5a of the first digit circuit is supplied.

In addition, to the delay circuit 5b of the second digit circuit, the output of the delay circuit 5a of the first digit circuit is given, and the output of the delay circuit 5b is given to the clock terminal CL of the D-flip flop 3c, the clock terminal CL of the D-flip flop 2c, and the delay circuit 5c of the third digit circuit, respectively.

To the input terminal D of the D-flip flop 3c of the third digit circuit, the output from the output terminal Q of the D-flip flop 3b of the second digit circuit is given, and to the clock terminal CL of the same, the output from the delay circuit 5b of the second digit circuit is given. The output signal from the output terminal Q of the same controls on/off of the transistor gate 4c and the output signal from the output terminal #Q of the same controls on/off of the transistor gate 4c.

To the carry input terminal Cin of the adder 1c of the third digit circuit, the carry output terminal Cout of the adder 1b of the second digit circuit is connected, and to the input terminal B of the same, the output terminal Q of the D-flip flop 2d of the fourth digit circuit is connected. The output terminal S of the same is connected to the input terminal D of the D-flip flop 2c through the transistor gate 4c#, and the carry output terminal Cout of the same to the carry input terminal Cin of the adder 1d of the fourth digit circuit.

The output terminal Q of the D-flip flop 2c of the third digit circuit is connected to the multiplication result higher register 9b, while to the clock terminal CL of the same, the output of the delay circuit 5b of the second digit circuit is supplied.

In addition, to the delay circuit 5c of the third digit circuit, the output of the delay circuit 5b of the second digit circuit is supplied, and the output of the same is connected to the clock terminals CL of the D-flip flops 3d, 2d and 2e of the fourth digit circuit, respectively.

To the input terminal D of the D-flip flop 3d of the fourth digit circuit, the output from the output terminal Q of the D-flip flop 3c of the third digit circuit is supplied, and to the clock terminal CL of the same, the output of the delay circuit 5c of the third digit circuit is supplied. The output signal from the output terminal Q of the same controls on/off of the transistor gate 4d as well as is inputted to the AND gate 11 and the output signal from the output terminal #Q of the same controls on/off of the transistor gate 4d#.

To the carry input terminal Cin of the adder 1d of the fourth digit circuit, the carry output terminal Cout of the adder 1c of the third digit circuit is connected, and to the input terminal B of the same, the output terminal Q of the D-flip flop 2e is connected. The output terminal S of the same is connected to the input terminal D of the D-flip flop 2d through the transistor gate 4d#, and the carry output terminal Cout of the same is inputted to the AND gate 11.

The output terminal Q of the D-flip flop 2d of the fourth digit circuit is connected to the multiplication result higher register 9c, and to the clock terminal CL of the same, the output of the delay circuit 5c of the third digit circuit is supplied.

In addition, the output of the AND gate 11 is inputted to the input terminal D of the D-flip flop 2e. The output of the D-flip flop 2e is supplied to the input terminal B of the adder 1d of the fourth digit circuit and the multiplication result higher register 9d as well as is inputted to the input terminal D of the D flip flop 2d of the fourth digit circuit through the transistor gate 4d.

In addition, each of the transistor gates 4a, 4b, 4c, 4d is turned on when the output signal from each of the D-flip flops 3a, 3b, 3c, 3d connected respectively to the transistor gates 4a, 4b, 4c, 4d is "0", and is turned off when "1". And each of the transistor gates 4a#, 4b#, 4c#, 4d# is turned on when the output signal from each of the inverted output terminal #Q of tILe D-flip flops 3a, 3b, 3c, 3d connected respectively to the transistor gates 4a#, 4b#, 4c#, 4d# is "0", and is turned off when "1".

And, each of the D-flip flops 3a, 3b, 3c, 3d latches a value of a signal being inputted in each of the input terminals D when the clock CLK being inputted in each of the clock terminals CL is "1", and each of the D-flip flops 2a, 2b, 2c, 2d, 2e latches a value of a signal being inputted in each of the input terminals D when the clock CLK being inputted in each of the clock terminals CL is "0".

In the following, explanation will be made on the operation of the multiplying apparatus of the invention having such a configuration as aforementioned.

At first, in each of the D-flip flops 2a, 2b, 2c, 2d, 2e and 3a, 3b, 3c, 3d in the initial state, it is assumed that the output signal from each of the output terminals Q is "0" and the output signal from each of the inverted output terminals #Q is "1".

The operation of the first digit circuit is as follows. According to the rising of the first clock CLK supplied from the control circuit 10, a value of an LSB of the multiplication register 6 is latched by the D-flip flop 3a. To the input terminal A of the adder (half adder:HA), a value of the multiplicand register 7a is inputted, and to the input terminal B of the same, a value "0" of the output signal from the output terminal Q of the D-flip flop 2b for the second digit is inputted respectively, and they are added to each other. The addition result is outputted from the output, terminal S of the adder 1a and the carry from the carry output terminal Cout, respectively.

And, according to a value of the LSB of a multiplier latched in the D-flip flop 3a, the transistor gates 4a, 4a# are turned on/off complementary. Thereby, as the input signal to the input terminal D of the D-flip flop 2a, either the output signal from the output terminal S of the adder 1a or the output signal from the output terminal Q of the D-flip flop 2b for the second digit, is selected.

At this time, after the input signal to the input terminal D of the D-flip flop 2a is selected by both of the transistor gates 4a, 4a#, the clock CLK outputted from the control circuit 10 fails down, and the value selected by both of the transistor gates 4a, 4a# is latched by the D-flip flop 2a. The value latched by the D-flip flop 2a becomes a multiplication result and inputted to the multiplication lower register 8.

At the same time when the addition of the next digit is performed and the addition result is latched to the D-flip flop 2a, the contents of the multiplication result lower register 8 is shifted to the right side by one digit.

In t he following, similarly, the contents of the multiplication result lower register 8 is successively shifted when addition is performed one digit by one digit while the contents of the multiplier register 6 is shifted to the left side one digit by one digit as well at the same timing and values of the respective dig its are outputted to the D-flip flop 3a.

The operation of the second digit circuit is as follows.

The inputs of the clock CLK to the D-flip flops 3a and 2b are delayed by the delay circuit 5a by the time enough for that the addition for the first digit is performed and the carry from the adder 1a is outputted to be inputted to the carry input terminal Cin of the adder 1b. According to the rising of the clock CLK, a multiplier, that is, a value of the output signal from the output terminal Q of the D-flip flop 3a is latched to the D-flip flop 3b.

Until this, the additional operation performed by the adder 1b being a full adder has been completed. The transistor gates 4b, 4b# are turned on/off complementary according to a value of the multiplier, and a value selected at the timing of the falling of the clock CLK delayed by the delay circuit 5a is latched to the D-flip flop 2b. This value becomes the input signal to the input terminal B of the adder 1a for the first digit and the second addition for the first digit is performed.

Also in the third digit circuit, the same operation as the aforementioned second digit circuit is performed.

The value latched by the D-flip flop 2c becomes the input signal to the input terminal B of the adder 1b of the second digit circuit and the second additional operation is performed in the second digit circuit.

And, also in the fourth digit circuit (the highest digit), almost the same operation is performed. But the point different from the aforementioned circuits for the respective digits is that, the logical product between the carry generated by the addition of the adder 1d and the multiplier is gained at the AND gate 11 and which the D-flip flop 2e is made latch, and the latched value is made be the input signal to the input terminal B of the adder 1d at the time of the next additional operation.

And the value selected by each of the transistor gates 4d, 4d# is either the output signal from the output terminal S of the adder 1d or the output signal from the output terminal S of the D-flip flop 2e.

As aforementioned, in the multiplying apparatus of the invention, the respective adders 1a, 1b, 1c, 1d perform additions of the next stage before additional operations of all of the digits are completed, and they operate in parallel except when carries are propagated at first and at last.

Here explanation will be made on the delay time of the delay circuits 5a, 5b, 5c.

FIG. 4 is a timing chart showing the relationship between a cycle t of the clock CLK generated by the control circuit 10, a delay tinge x by the respective delay circuits 5a, 5b, 5c, and an operation time y by the respective adders 1a, 1b, 1c, 1d.

When a multiplication of n bits is performed, the clock CLK of the cycle t is outputted n times from the control circuit 10. During the time x from the timing of the rising of the clock CLK1 given to the first digit circuit to the timing of the rising of the clock CLK2 given to the second digit circuit, it is necessary for the operation performed by the adder 1a of the first digit circuit to be finished. In order to compensate the time y for the necessity, it is necessary for the clock CLK1 to be given to the second digit circuit after being delayed by the delay circuit 5a by the time x.

From the above-mentioned, when it is assumed that the delay time of the delay circuit 5a is x, it is proper that the relationship $$y < x < t$$

is satisfied. This relationship is common to the delay circuits 5a, 5b, 5c of the circuits for the respective digits.

Accordingly, in case of n-bit multiplication, the clock CLK1 is generated n times from the control circuit 10 to be given to the first digit circuit. And each clock CLK1 is delayed by the delay circuit 5a by the time x to be given to the second digit circuit. Also similarly to the other each digit circuit, the clock CLK is delayed by each delay circuit by the time x to be propagated.

As a while, the clock CLK1 is generated on n times from he control circuit 10 and is given to the first digit circuit. And at the timing of the falling of the clock CLKn in he n-th digit circuit, the operation is finished and the final operation result is outputted.

In such a multiplying apparatus of the invention, the cycle of the clock CLK can be shortened to a time required For one digit addition, in other words, to the time y required for one time additional operation by each of the adders, regardless of the digit number of a multiplication.

In addition, explanation was made on the case where a multiplier and a multiplicand is four bits in the aforementioned embodiment, however, the invention is not limited to this, and it is a matter of course that the invention can be applied regardless of the bit number of a multiplier and a multiplicand when the circuits for the intermediate digits except the first digit and the highest digit, having the same configuration, are increased in number.

As described above, according to the multiplying apparatus of the invention, the hardware quantity is reduced as well as high speed processing is realized since the repetitious addition according to the microprogram does not have to be performed although the adder configuration is of only one stage. In the aforementioned embodiment, explanation was made on the specific circuit in which four digits (four bits) multiplication is performed, though, the larger the digit number of a multiplier becomes, the larger the effect of the invention becomes, that is, the hardware quantity reduction and the high speed processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A multiplying apparatus, comprising:

a control circuit for generating a clock;

a multiplicand register for storing values of respective digits of a multiplicand;

a multiplier register for storing values of respective digits of a multiplier, and outputting successively the values of the respective digits of the multiplier in synchronism with the clock generated by said control circuit;

adders for respective digits of the multiplicand, each adder inputting, at a first input terminal, a value of a respective digit of the multiplicand stored in said multiplicand register, and, except for the adder receiving the most significant digit of the multiplicand, at a second input terminal, the respective addition result of the next respective digit, the adder receiving the most significant digit of the multiplicand inputting at its second input terminal a logical product of the carry output of itself and the final digit of the multiplier, each adder adding the inputs of the respective first and second input terminals and outputting the respective addition result and carry;

first D-flip flops for respective digits, each first D-flip flop propagating to the respective adder corresponding to the next digit of the multiplicand the value of the respective digit of the multiplier outputted successively from said multiplier register in synchronism with the clock, and latching the successively output value in synchronism with the clock;

second D-flip flops for respective digits, each second D-flip flop latching, in synchronism with the clock, (i) the additional result of the adder corresponding to the respective digit or (ii) the additional result of the adder corresponding to the next digit according to the value held in respective first D-flip flop; and delay circuits for delaying the clock propagation and supplying it to the first D-flip flops and the second D-flip flops for respective next digits, until the respective carries of the additional results performed by the respective adders, except the adder receiving the most significant digit, are input to the adders for the next digits.

2. The multiplying apparatus as set forth in claim 1, wherein the adder inputting a value of the first digit of the multiplicand stored in said multiplicand register comprises a half adder, and the other adders comprise full adders.

3. The multiplying apparatus as set forth in claim 1, further comprising registers for storing as the additional results the values latched respectively in said second D-flip flops.

* * * * *